US008203424B2

(12) United States Patent
Ghabra et al.

(10) Patent No.: US 8,203,424 B2
(45) Date of Patent: Jun. 19, 2012

(54) AUTOMATIC WALK-AWAY DETECTION

(75) Inventors: Riad Ghabra, Dearborn Heights, MI (US); Ronald O. King, Brownstown, MI (US); John Nantz, Brighton, MI (US); Bryan Vartanian, Livonia, MI (US); Keith A. Christenson, Canton, MI (US)

(73) Assignee: Lear Corporation, Southfield, MI (US)

( * ) Notice: Subject to any disclaimer, the term of this patent is extended or adjusted under 35 U.S.C. 154(b) by 646 days.

(21) Appl. No.: 12/410,895

(22) Filed: Mar. 25, 2009

(65) Prior Publication Data

US 2010/0245038 A1 Sep. 30, 2010

(51) Int. Cl.
*B60R 25/00* (2006.01)
*G05B 19/00* (2006.01)

(52) U.S. Cl. .................................... 340/5.6; 340/5.72

(58) Field of Classification Search ................. 340/5.72, 340/539.21, 539.23, 5.1, 5.27, 5.61; 455/343
See application file for complete search history.

(56) References Cited

U.S. PATENT DOCUMENTS 5,379,033 A * 1/1995 Fujii et al. .................... 340/5.64
5,600,323 A * 2/1997 Boschini ....................... 341/173
5,973,611 A * 10/1999 Kulha et al. .................. 340/5.62
6,236,333 B1 * 5/2001 King ............................ 340/5.61
6,359,348 B1 * 3/2002 King ............................ 307/10.1
6,552,649 B1 * 4/2003 Okada et al. ................. 340/5.61
6,570,486 B1 5/2003 Simon et al.
6,593,856 B1 * 7/2003 Madau ....................... 340/12.27
6,617,961 B1 * 9/2003 Janssen et al. ................. 340/5.8
6,850,148 B2 * 2/2005 Masudaya .................... 340/5.61
7,224,980 B2 * 5/2007 Hara .......................... 455/456.1
7,336,151 B2 * 2/2008 Ueda et al. ................... 340/5.72
2002/0025823 A1 * 2/2002 Hara ............................. 455/456
2004/0140883 A1 * 7/2004 Jalil et al. ...................... 340/5.64
2004/0201277 A1 10/2004 Hentsch et al.
2005/0110619 A1 5/2005 Klein
2005/0237163 A1 * 10/2005 Lee et al. ................... 340/10.51
2007/0024416 A1 * 2/2007 Tang et al. ................... 340/5.61
2007/0085656 A1 4/2007 Tang et al.
2007/0085658 A1 4/2007 King et al.
2007/0205862 A1 9/2007 Brillon
2007/0216517 A1 * 9/2007 Kurpinski et al. ........... 340/5.72
2007/0268110 A1 11/2007 Little
2008/0061929 A1 * 3/2008 Cromer et al. ............... 340/5.61

* cited by examiner

*Primary Examiner* — Daniel Wu
*Assistant Examiner* — Mohamed Barakat
(74) *Attorney, Agent, or Firm* — Brooks Kushman P.C.

(57) ABSTRACT

A method and system for walk-away locking of a vehicle. The vehicle may be automatically locked when an occupant walks away from the vehicle in a passive manner. The automatic locking capabilities may be incorporated within an energy conservation strategy that allows one or more vehicle components and a fob to enter a sleep mode or otherwise become inactive at particular intervals when signals necessary to automatically locking the vehicle are less likely.

20 Claims, 2 Drawing Sheets

AUTOMATIC WALK-AWAY DETECTION

BACKGROUND OF THE INVENTION

1. Field of the Invention

The present invention relates to methods and systems of automatically determining a vehicle occupant has walked away from a vehicle, such as to facilitate automatically locking the vehicle.

2. Background Art

Some vehicles include wireless capabilities that allow the vehicle to exchange signals with a wireless device, such as but not limited to a fob or other device carried by an occupant. The ability to exchange signals with the fob can be used to control vehicle operations, such as locking or unlocking the vehicle. In the past, remote keyless entry (RKE) systems required a user to initiate such wireless signal exchanges. This can be inconvenient to the occupant if the occupant is unable to easily instigate the signal exchange.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompanying drawings in which:

DETAILED DESCRIPTION OF THE PREFERRED EMBODIMENT(S)

Figure 1:
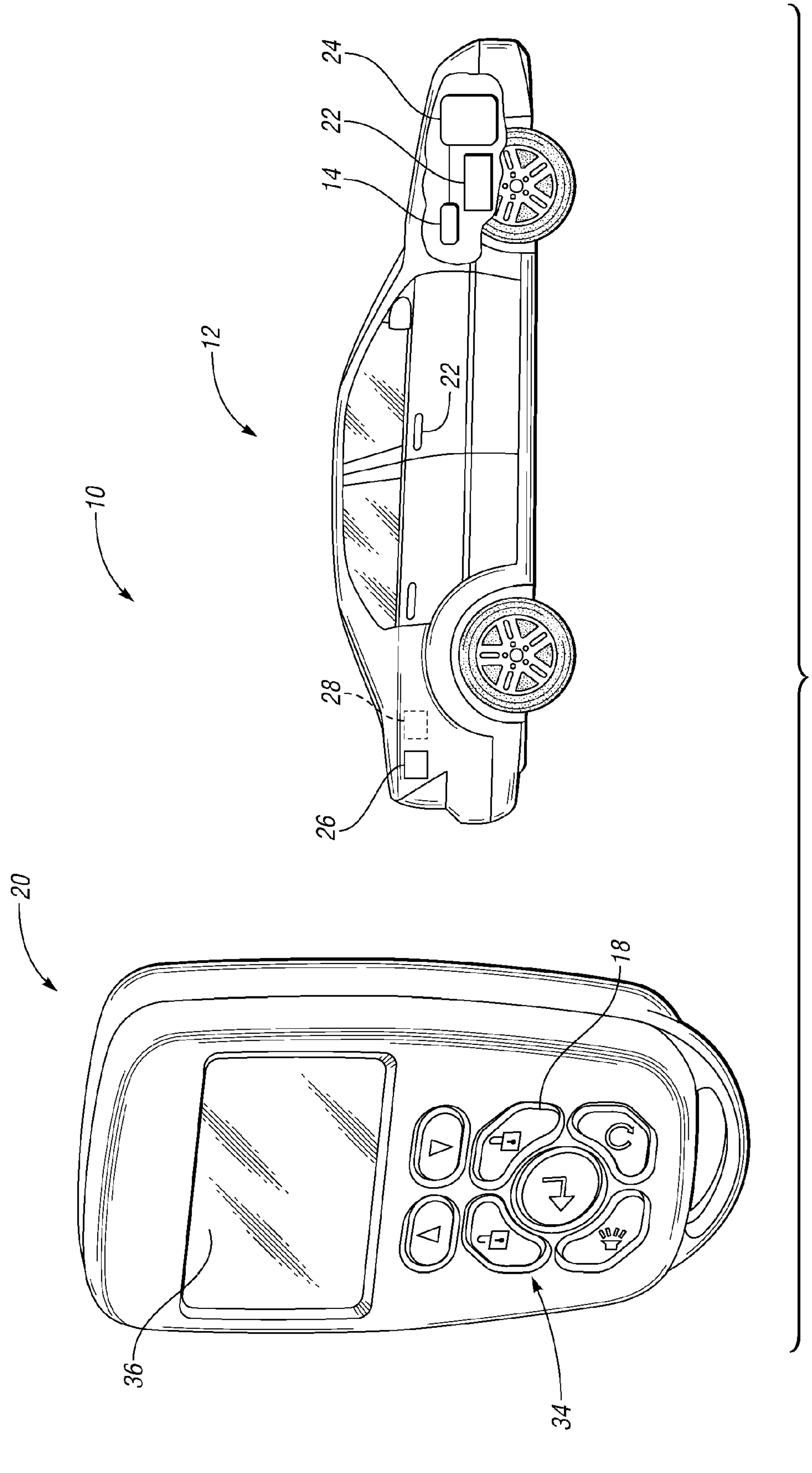
FIG. 1 illustrates a system for walk-away detection in accordance with one non-limiting aspect of the present invention.

FIG. 1 illustrates a system 10 for walk-away detection in accordance with one non-limiting aspect of the present invention. The system 10 is shown to include a vehicle 12 having a controller 14 configured to automatically lock one or more vehicle doors or to perform some other vehicle control after an occupant is determined to have walked away from the vehicle 12. The automatic locking may be characterized as passive in that one of more of the vehicle doors may be locked without requiring occupant interaction, e.g., the occupant need not depress a locking button 18 on a fob device 20 or a door lock button 22 included on one of the vehicle doors, although occupant actuated functionality is enabled.

The ability to automatically lock the door without occupant interaction can be beneficial in some circumstances where it may be inconvenient for the occupant to actuate one of the door lock buttons 18, 22. Alternatively, the ability to automatically lock the doors may be helpful when the occupant has simply forgotten to lock the vehicle 12. The controller 14 may be configured to monitor a position of the fob 20 relative to the vehicle 12 in order to determine whether the occupant has walked away, and optionally, a need to automatically lock the doors. This may be useful to insure the doors are not inadvertently locked when the fob 20 is within the vehicle 12 or while the occupant is sufficiently close.

The controller 14 may include a receiver 22 and a number of transmitters 24, 26, 28 positioned at different sides of the vehicle 12 to facilitate wireless communications with the fob 20. The fob 20 may similarly include a receiver and transmitter (not shown) to facilitate wireless communications with the vehicle 12. The exchange of signals between the fob 20 and controller 14 may be executed according to any protocol and transmission requirements. Optionally, the wireless communication may be suitable to supporting smart entry system (SES) related operations and remote keyless entry (RKE) related operations. The fob 20 may include a number of buttons 34 and a display 36 to support related SES and RKE operations, as well as control of other vehicle operations.

The capabilities to support SES and RKE operations may be helpful in facilitating automatic walk-away locking while also support desirable RKE functionality. The SES capabilities allow the fob 20 to support any type of non-occupant dependent communications with the vehicle 12. This may include supporting passive entry (PE) related operations and other operations of the type where a signal used to control a vehicle operation is transmitted from the fob 20 without requiring the occupant to depress a fob button 34.

One SES capability contemplated by the present invention relates to the fob 20 transmitting a presence signal to the controller 14 to indicate its presence near the vehicle 12. The presence, or lack thereof, of the fob 20 near the vehicle 12 can be used by the controller 14 to assess whether the occupant has walked-away from the vehicle and that the doors should be locked or that some other action should be taken. As described in more detail below, the controller 14 may transmit a low frequency (LF) presence request signal to the fob 20 upon vehicle shutdown, door opening/closing, or other vehicle sensed condition that indicates a possible exit of the occupant.

A response of the fob 20 to the presence request signal can be used to indicate a presence of the occupant near the vehicle 12, or within a desired distance to the vehicle, and that it may be desirable for the vehicle 12 to remain unlocked. A lack of a fob 20 response to the polling signal, in contrast, can be used to indicate the fob 20 has moved beyond a LF range of the vehicle 12 and that it may now be a suitable time to lock the vehicle 12. The LF range of the vehicle 12 may be controlled or configured to facilitate determining the presence of the occupant within any desirable range of the vehicle 12.

Optionally, if the fob 20 includes a proximity sensor or other capability to senses its distance from the vehicle 12, the fob 20 may transmit a signal indicating it is far enough away from the vehicle 12 that the doors can be locked. The fob 20 may also be configured to automatically transmit an ultra high frequency (UHF) if it has not received the presence request from the controller 14 to indicate a need to lock the doors. The fob 20 may be triggered to emit the UHF signal by an elapse of time. For example, the fob 20 may include a timer (not shown) that is wirelessly instructed by the controller 14 or otherwise programmed to expect the presence request signal from the vehicle 12 at a particular instance in time. If the signal is not received at that instance, the fob 20 may assume it is beyond a zone of the vehicle 12, and in response, transmit the UHF signal that the controller 14 would use to determine the occupant has walked away from the vehicle 12.

Regardless of how the response to the presence request signal is transmitted, one non-limiting aspect of the present invention contemplates the signal being transmitted without occupant interaction with the fob 20. This capability may be characterized as an SES mode of operation in so far as vehicle operations (e.g., door locking) may be executed without requiring occupant interaction. At the same time, the present invention is not intended to be so limited and fully contemplates allowing the occupant to instruct vehicle locking, such as by depressing a corresponding RKE button 34 included on the fob 20. The use of the RKE buttons 34 to lock the vehicle 12 or to execute other RKE functions (e.g., unlock, panic, alarm, etc.) may be characterized as an RKE mode of operation.

The present invention contemplates facilitating SES and RKE modes of operation. Because SES mode of operation, or the vehicle operation typically controlled through SES types of operation (e.g., without occupant interaction), may have some vehicle proximity requirements and the RKE mode of operation may not have similar proximity requirements, the FOB 20 may be configured to receive LF signals when operating in SES mode and to receive UHF signals when operating in RKE modes. This signal variability can be helpful in conserving battery life since the UHF signal consumes more energy than the LF signals.

A battery life of a battery or other energy storage device (not shown) included within the vehicle 12 may be conserved in this manner by inactivating or turning off the receiver 22 or controller 14 at selectable intervals of time and by limiting the processing capabilities during the periods of time when it is active, e.g., battery energy may be conserved by preventing the processing of RKE signals when operating in SES mode.

Figure 2:
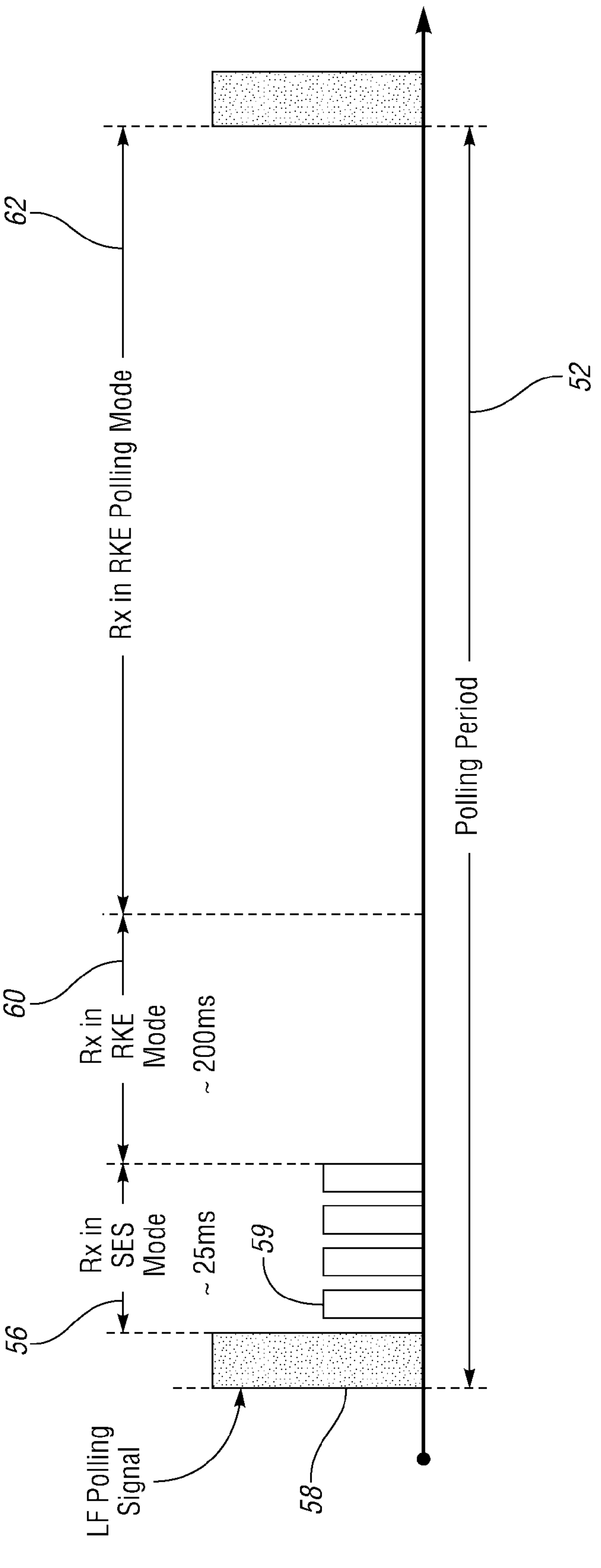
FIG. 2 illustrates a polling cycle used to selectably control battery usage in accordance with one non-limiting aspect of the present invention.

FIG. 2 illustrates a polling cycle 50 used to selectably control battery usage according to process of selectively acting and inactivating the receiver 22 and selectively waking and sleeping the fob 20. Since maintaining the receiver 22 in the active state may consume the most energy, FIG. 2 is described with respect to inactive and active controls of the receiver. The transmitters or other controllable devices on the vehicle 12 used to support wireless communications may be controlled in a similar manner.

The polling cycle may be include a polling period 52 of controllable duration during which the receiver 22 is selectively operated to support SES and RKE modes and the fob 20 is switched between sleep and wake modes. An SES period 56 may correspond with an interval of the polling cycle during which the receiver 22 is continuously active, e.g., “on”, and supporting SES related signaling with the fob 20. During this period, the RKE mode related capabilities of the receiver 22 may be inactivated or otherwise prevented from processing RKE signals transmitted by the fob 20, e.g., RKE messages transmitted by the fob may be dropped without processing.

As part of the presence detection, the controller 14 may transmit a LF presence request signal 58 as a polling signal to request the fob 20 to respond with a presence response 59 if the fob 20 receives the request. Transmission of the presence request signal 58 may be triggered by vehicle shutdown, door opening/closing, or other triggers representative of the occupant exiting the vehicle 12. The receiver 22 may actively remain in SES mode for a short period after transmitting the presence request signal 58 in order to process any SES response 59 from the fob 20. Should the fob 20 fail to respond, the doors may be automatically locked, and if the fob 20 responds, the doors may remain unlocked.

An RKE mode 60 may begin after the SES mode56. The RKE mode 60 may correspond with a slightly longer period during which the receiver 22 is continuously active but active only with respect to processing RKE mode related signaling, i.e., messaging associated with the SES mode related capabilities would be dropped. During this period the fob 20 may be transition from an awake mode into a sleep mode. The sleep mode, like the inactive mode of the receiver, may be entered to conserve battery life of the fob 20 by preventing the fob 20 from transmitting or receiving signals until a trigger event wakes it and places it into the awake mode.

The fob 20 may awake to transmit RKE related messages upon activation of one of the buttons 34. These messages would be processed by the receiver 22 and used to control related vehicle operations, such as but not limited to door unlock, alarm arming, panic alert, etc. The sleep mode entered by the fob 20 upon expiration of the SES mode period may be characterized as a period within it is unable to process the presence signal or other SES mode signals but during which energy is conserved since it is not actively looking for signal. The fob 20 would start consuming more energy if it is awoken from the sleep mode with depression of one of the buttons (e.g. RKE event) or with the timer.

Since the fob 20 can be awoken from the sleep mode with an RKE event, the receiver 22 may be active throughout the RKE mode period 60 in the event that such a signal is received. To ameliorate the amount of energy consumed from the battery, however, the RKE period 60 may be followed with a longer RKE polling mode 62 during the receiver 22 is alternated between active and inactive states. In the inactive state, the receiver 22 may essentially be “off” in order to limit energy consumption. Any RKE related message would not be processed while the receiver 22 is inactive, i.e., an RKE command to unlock the vehicle would not be executed. When active, however, the RKE command to unlock the vehicle 12 would be executed and the vehicle 12 would be unlocked. The duty cycle during which the receiver 22 is alternated between the inactive and active states may be selectably controlled according to desired performance parameters.

Following the completion of the RKE polling mode period 62, the polling cycle 50 may be repeated. The subsequent repetition may begin in a similar manner in so far as a LF presence request signal 58 may be transmitted to the fob 20. Unless an RKE button 34 was depressed to wake the fob 20 or another triggering event takes place, the fob 20 may be in the sleep mode at the time the cycle 50 restarts. In that case, the fob timer may be used to awake the fob 20 in anticipation of the presence request signal 58. Data may be programmed into the time or included with signal transmitted from the vehicle 12 in order to instruct the timer when to wake the fob 20, such as to receive the presence request signal 58, and when to place the fob 20 into sleep mode, such as during the periods 60, 62.

As in the previously described cycle, subsequent cycles may include the receiver 22 being initially operated in SES mode for a period of time 56 to determine if a response 59 is made by the fob 20, which may then be followed by temporarily operating in continuously active RKE mode 60 before a period of alternate active and inactive RKE mode operation is commenced in an RKE polling mode 62. This succession of intervals may be continuously repeated after the doors are locked so that future SES commands can be properly processed, such as if the occupant is returning to the vehicle and the doors need to be unlocked through SES mode related operations, and so that future RKE commands can be properly processed, such as if the occupant initiates a remote start or trunk opening.

Optionally, the length of one or more of the periods 56, 60, 62 may be adjusted with each pass through the cycle 50, such as by increasing or decreasing duration of one or more of the periods 56, 60, 62 depending on whether a fob response was received or not received in during the last cycle. This variability may be further controlled depending on whether the presence of the fob 20 was detected. If, for example, the presence of the fob 20 was not detected, then subsequent periods may include shortening one or both of the SES mode periods 56 and RKE mode periods 60 and/or lengthening the RKE mode polling period 62 on the assumption that the next signal for processing is unlikely for a longer period of time since the fob 20 has left the vicinity of the vehicle. If, however, the presence of the fob 20 was detected, then subsequent periods may include lengthening the SES mode period 56 and/or RKE mode 60 while shortening the RKE polling mode 62 on the assumption that the next signal for process is more likely to occur since the fob 20 is within the vicinity of the vehicle 12.

As supported above, one non-limiting aspect of the present invention relates to automatic locking in a passive entry system. In one form, if a user exits a vehicle, closes the doors, and walks away, the system of the present invention will recognize that and automatically lock the vehicle. A set of challenges may be implemented to address a need to automatically lock the vehicle. This may include the vehicle periodically sends an LF signal (polling) to a fob. The fob cab respond to the polling signal with a UHF response if it is within a field of the signal. The vehicle can determine if the fob has left a specified zone by either lack of response or by receiving a response that indicates the fob is outside the proper zone. In addition, the fob can transmit a UHF signal indicating that it left the zone if it no longer can detect the LF polling signal. After a determination that the fob has departed from the exterior zone, the controller may be configured to check one last time for the presence of the fob before it locks the car.

One non-limiting aspect of the present invention relates to a timeout feature for locking that is on the order of minutes. For example, a 15 minute timeout after which the system will cancel the function if the set of conditions allowing the lock do not materialize. This timeout may be too long for the fob to stay awake because of resulting battery drain. Therefore, the fob may be put to sleep and then woken-up to check if it has exited the magnetic field zone exterior to the vehicle. Once it wakes up and does not receive the LF polling signal, it can send the UHF lock confirmation. Optionally, the LF presence request signal may include some information on the polling frequency on the next expected LF presence request signal. This can be used to indicate to the fob how often to wakeup and check for LF polling signal.

One non-limiting aspect of the present invention relates to checking whether the fob is anywhere within 2 m (or other range) from the outside of any point on the vehicle (optionally, except the front). To check the other three sides of the vehicle, the controller may poll in sequence between the three antennas include on the desired sides of the vehicle. A response of the fob then could be used to determine the location of the fob relative to the sides according to the side of the last antenna to correspond with the fob. Optionally, the signals, or data carried in the signals, may mark the side of the car transmitting the signals to the fob. The fob may respond with this data to indicate the antenna it is responding to.

In some cases, this sequential process of transmitting signals from antennas on different sides of the vehicle may be helpful in environments where the hardware is not capable of simultaneously transmitting the signals on three antennas or when zone overlap destructively interferes with simultaneous transmissions. Optionally, the sequence may be modified to simultaneously transmit from right and left sides of the vehicle.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automatic walk-away detection system for use with a vehicle comprising: a fob configured to passively emit an in-zone signal upon receipt of a query signal and to emit an out-of-zone signal when the query signal is not received within an identified period of a repeatedly recurring timing loop programmed to the fob; and a controller within the vehicle configured to issue the query signal at a beginning of the identified period and to automatically lock the vehicle depending on whether the fob is considered to have walked away from the vehicle, wherein the controller considers the fob to have walked away from the vehicle upon receipt of the out-of-zone signal and Wherein the controller considers the fob to have walked away from the vehicle upon failure to receive the in-zone signal during the identified time period.

2. The system of claim 1 wherein the fob includes a timer configured to time the repeatedly recurring timing loop and to wake the fob from a sleep mode before the identified period begins in order for the fob to detect the query signal or emit the out-of-zone signal.

3. The system of claim 2 wherein the timer places the fob into the sleep mode upon completion of the identified period, wherein the fob is unable to passively emit the in-zone or out-of-zone signals when in sleep mode.

4. The system of claim 2 wherein the controller transmits wireless signals to the fob that instruct the timer of the identified period.

5. The system of claim 4 wherein the controller changes the duration of the identified period depending on whether the in-zone signal is received.

6. The system of claim 1 wherein the controller re-issues the query signal in order to confirm the fob has walked away from the vehicle upon a failure of the fob to respond to the re-issued query signal.

7. The system of claim 1 wherein the fob only issues the out-of-zone signal one time for each time the fob is considered to have walked away from the vehicle.

8. A method of supporting a smart entry system (SES) and remote keyless entry (RKE) while conserving battery life by selectively activating and deactivating a receiver used within a vehicle by a controller to capture SES and RKE related wireless signals, the method comprising:

at a first instance in time, transmitting a fob polling signal from the vehicle;

for a first period of time occurring after the first instance, operating the receiver in a first operating mode characterized as a SES mode, the receiver being continuously active and configured to process only SES signals received from the fob when in the first operating mode;

for a second period of time occurring after the first period, operating the receiver in a second operating mode characterized as a RKE mode, the receiver being continuously active and configured to process only RKE signals received from the fob when in the second operating mode; and for a third period of time occurring after the second period, operating the receiver in a third operating mode characterized as a an RKE polling mode, the receiver alternating between active and inactive states when in the third operating mode such that the receiver is only able to process the RKE signals when active.

9. The method of claim 8 further comprising instructing the fob to enter a sleep mode upon expiration of the first period of time and to awake from the sleep mode upon expiration of the third period of time.

10. The method of claim 8 further comprising identifying a next transmission of the fob polling signal, the identified next transmission indicating a second instance in time when another fob polling signal will be transmitted from the vehicle.

11. The method of claim 10 further comprising identifying the next transmission for another fob polling signal with a timer included within the fob.

12. The method of claim 10 further comprising identifying the next transmission for another fob polling signal from data included within a prior polling signal.

13. The method of claim 10 further comprising instructing the fob to enter a sleep mode for at least a portion of time occurring after the fob polling signal and before the another fob polling signal.

14. The method of claim 10 further comprising instructing the fob to transmit an out-of-zone SES presence signal if the fob fails to receive the another fob polling signal transmitted at the second instance or other pre-determined instance(s) in time.

15. The method of claim 8 further comprising locking the vehicle if an SES presence response is not received from the fob during the SES mode.

16. The method of claim 8 further comprising locking the vehicle if an SES presence response indicates the fob is beyond a predefined distance from the vehicle.

17. The method of claim 8 further comprising transmitting the fob polling signal at the first instance of time from a first side of the vehicle.

18. The method of claim 17 further comprising transmitting another fob polling signal at a second instance of time from a second side of the vehicle if an SES presence response is not received from the fob in response to the fob polling signal transmitted at the first instance in time; and locking the vehicle if the SES presence response is not received from the fob in response to either one of the fob polling signals sent at the first and second instances in time.

19. The method of claim 8 further comprising repeatedly cycling through the transmission of the fob polling signal and the following first, second, and third operating modes according the order specified in claim 8 if the vehicle remains unlocked, including increasing or decreasing one or more of the first, second, and third time periods when repeating at least one of the cycles.

20. A controller operable for supporting a smart entry system (SES) and remote keyless entry (RKE) while conserving battery life by selectively activating and deactivating a receiver used within a vehicle to capture SES and RKE related wireless signals, the controller operable to:

at a first instance in time, transmit a fob polling signal from the vehicle;

for a first period of time occurring after the first instance, operate the receiver in a first operating mode characterized as a SES mode, the receiver being continuously active and configured to process only SES signals received from the fob when in the first operating mode;

for a second period of time occurring after the first period, operate the receiver in a second operating mode characterized as a RKE mode, the receiver being continuously active and configured to process only RKE signals received from the fob when in the second operating mode; and for a third period of time occurring after the second period, operate the receiver in a third operating mode characterized as a an RKE polling mode, the receiver alternating between active and inactive states when in the third operating mode such that the receiver is only able to process the RKE signals when active.

* * * * *

UNITED STATES PATENT AND TRADEMARK OFFICE

CERTIFICATE OF CORRECTION

PATENT NO. : 8,203,424 B2
APPLICATION NO. : 12/410895
DATED : June 19, 2012
INVENTOR(S) : Riad Ghabra et al.

It is certified that error appears in the above-identified patent and that said Letters Patent is hereby corrected as shown below:

Column 6, Line 23, Claim 1:

After “out-of-zone signal and” delete “Wherein” and insert -- wherein --.

Column 6, Line 67, Claim 8:

After “characterized as” delete “a”.

Column 8, Line 9-10, Claim 19:

After “modes according” insert -- to --.

Column 8, line 23, Claim 20:

After “characterized as” delete “a SES” and insert -- an SES --.

Column 8, Line 28, Claim 20:

After “characterized as” delete “a RKE” and insert -- an RKE --.

Column 8, Line 34, Claim 20:

After “characterized as” delete “a”.

Signed and Sealed this
Twenty-fifth Day of September, 2012

David J. Kappos
*Director of the United States Patent and Trademark Office*